United States Patent
Lin

(10) Patent No.: US 6,665,438 B1
(45) Date of Patent: Dec. 16, 2003

(54) METHOD FOR HYPERSPECTRAL IMAGERY EXPLOITATION AND PIXEL SPECTRAL UNMIXING

(75) Inventor: Ching-Fang Lin, Chatsworth, CA (US)

(73) Assignee: American GNC Corporation, Simi Valley, CA (US)

(*) Notice: Subject to any disclaimer, the term of this patent is extended or adjusted under 35 U.S.C. 154(b) by 0 days.

(21) Appl. No.: 09/351,349

(22) Filed: Jul. 12, 1999

Related U.S. Application Data
(60) Provisional application No. 60/132,609, filed on May 5, 1999.

(51) Int. Cl.[7] ............................. G06K 9/46; G06K 9/40; G06K 9/36
(52) U.S. Cl. ..................... 382/191; 382/260; 382/276
(58) Field of Search .......................... 382/260, 103, 382/276, 277, 157, 100, 156, 191, 155; 700/50, 55; 706/1–9, 900; 701/40, 27, 57, 77, 98, 106; 702/152

(56) References Cited

U.S. PATENT DOCUMENTS
| | | | | |
|---|---|---|---|---|
| 6,075,891 A | * | 6/2000 | Burman | 382/191 |
| 6,487,516 B1 | * | 11/2002 | Amorai-Moriya | 702/152 |
| 6,504,943 B1 | * | 1/2003 | Sweatt et al. | 382/103 |
| 6,510,354 B1 | * | 1/2003 | Lin | 700/55 |

OTHER PUBLICATIONS
Chein–I Chang I.E.E.E Transactions on Aerospace and Electronic Systems vol. 35, No. 1.*
Anderson I.E.E.E Aerospace Conference, pp. 177–181 vol. 4.*
Chein–I Chang, I.E.E.E. Transactions on Geoscience and Remote Sensing, vol. 37, No. 1.*

* cited by examiner

Primary Examiner—Amelia M. Au
Assistant Examiner—Brian Le
(74) Attorney, Agent, or Firm—Raymond Y. Chan; David and Raymond Patent Group

(57) ABSTRACT

An efficiently hybrid approach to exploit hyperspectral imagery and unmix spectral pixels. This hybrid approach uses a genetic algorithm to solve the abundance vector for the first pixel of a hyperspectral image cube. This abundance vector is used as initial state in a robust filter to derive the abundance estimate for the next pixel. By using Kalman filter, the abundance estimate for a pixel can be obtained in one iteration procedure which is much fast than genetic algorithm. The output of the robust filter is fed to genetic algorithm again to derive accurate abundance estimate for the current pixel. The using of robust filter solution as starting point of the genetic algorithm speeds up the evolution of the genetic algorithm. After obtaining the accurate abundance estimate, the procedure goes to next pixel, and uses the output of genetic algorithm as the previous state estimate to derive abundance estimate for this pixel using robust filter. And again use the genetic algorithm to derive accurate abundance estimate efficiently based on the robust filter solution. This iteration continues until pixels in a hyperspectral image cube end.

38 Claims, 7 Drawing Sheets

METHOD FOR HYPERSPECTRAL IMAGERY EXPLOITATION AND PIXEL SPECTRAL UNMIXING

CROSS REFERENCE OF RELATED APPLICATION

This is a regular application of a provisional application having an application No. of 60/132,609 and a filing date of May 05, 1999.

TECHNICAL FIELD

This invention was made with Government support under Contract No. NAS13-99024 awarded by the NASA John C. Stennis Space Center, MS39529-6000. The Government has certain rights in the invention.

BACKGROUND OF THE PRESENT INVENTION

1. Field of the Invention

The present invention relates to remote sensing imagery processing, and more particularly to a method for hyperspectral imagery exploitation and unmixing using hybrid approaches including evolutionary computing techniques and robust filtering techniques.

2. Description of Related Arts

The term, hyperspectral data, is ambiguous in and of itself The unifying trait of all hyperspectral data is the existence of a gross quantity of specific and minuscule spectral bands located within the optical wavelength region. The exact quantity of bands relating to any hyperspectral image varies widely. A single band range located within the visible wavelength region might vary between a single nanometer to hundreds of nanometers. Band ranges located within the infrared and thermal wavelength regions might exceed those for the visible wavelength region. Of course, hyperspectral data is exceedingly desirable, due to the ease with which one may recognize observed entities based on very specific characteristic features, corresponding to those entities, which are associated with very narrow spectral bands. This type of detection and recognition is simply not possible using traditional methods.

The disadvantage associated with hyperspectral data is the necessary capability to process extraordinary amounts of information. Specific elements, entities or objects, or components thereof, possess specific spectral signatures. One's ability to ascertain a specific spectral signature results in one's ability to ascertain the corresponding element. Previous methods for dealing with hyperspectral data included pattern matching techniques. These techniques rely upon models and least squares algorithms in order to recognize and isolate elements within hyperspectral data. These pattern matching techniques are limited by their lack of robustness. Their results degrade significantly across spatial and temporal variations. They are inadequate at recognizing elemental components from a combined spectral signature. They require a tremendous amount of computation. Their results degrade significantly across sensor and atmospheric variations. They do not deal with nonlinearity well. Also, these techniques do not respond well to increasing databases of elements for which to detect within the hyperspectral data.

Evolutionary Computing (EC) techniques lend themselves well to nonlinear optimization. Evolutionary Computing techniques result from an aggregate of recently developed sophisticated computational fields, such as Genetic Algorithms, Genetic Programming, Artificial Neural Networks, and Artificial Life. These realms are ideal for sifting through hyperspectral data and performing pattern matching. Aside from matching spectral signatures compiled in databases to spectral signatures extracted from hyperspectral imagery, these EC techniques may yield the very procedures, resulting from iterations of searches, which may be used to analyze the hyperspectral data to begin with. These techniques have the benefit of "learning." The rudimentary basis of an Evolutionary Algorithm (EA) is a pool of arbitrary entities, wherein each entity represents a method for analyzing a specific aspect of a set of data. Please refer to FIG. 1 for a depiction of an Evolutionary Algorithm.

Darwin's survival of the fittest concept of genetics and evolutionary processes serves as the framework for the Evolutionary Algorithmic approach to optimization tasks. Beginning with a pool of possible candidate methods for remedying a certain problem, a new generation of unique, and supposedly better (i.e. more fit), methods results from arbitrary pairings, or matings, if you will, of the parent, or original, generation of methods. Once the parent methods have been paired off to mate, they swap parts of their individual methods with one another, This exchange of method, or chromosomal information, is called crossover or reproduction. Two distinct, original methods result from the reproduction process and the parent methods no longer exist. Only the offspring survive the crossover process. The offspring must be capable of analyzing the same aspects of the data as their parents were able to do so. Mutations occur arbitrarily within each successive generation to introduce necessary diversity.

The offspring methods of each successive generation are tested as to their abilities in analyzing the data. The user stipulates the criteria against which the offspring methods are judged. The methods of each generation receive scores. These scores designate the fitness of each method, i.e. the appropriateness of each method in analyzing the data according to the user's criteria. Less fit methods are not allowed to mate and produce successive generations, therefore they are extinguished and become extinct. Methods, which have achieved high fitness scores, are allowed to mate and crossover, therefore they propagate themselves and continue their species. This survival of the fittest evolutionary scheme continues for a specific, user selected, number of generations. This approach results in a swift convergence upon the optimal method for analyzing a given pool of data. Tasks, such as spectral unmixing and object detection and identification lend themselves exceedingly well to this type of evolutionary approach. Therefore, as an extension of the above statement, hyperspectral data present themselves as ideal candidates for Evolutionary Computing techniques.

The resulting method with the best fitness score, after having been judged against the user's criteria, at the end of the process, after all of the allowed generations have propagated themselves, is the optimal method for analyzing the given set of data. Evolutionary Algorithms typically provide much better solutions than traditional methods, due to the fact that the search process is possesses much greater breadth of options. Evolutionary Algorithms conduct a simultaneous scouring of the entire pool of candidates. Evolutionary Algorithms do not choke on complex optimization tasks, including constraints. Evolutionary Algorithms have no problem with nonlinearities. Nonlinearities often present themselves in relation to atmospheric and sensor constraints associated with hyperspectral imagery data. The cost function associated with the resulting fitness judgments reflect these nonlinearities and constraints.

FIG. 2 represents a depiction of the application of Evolutionary Computing techniques to hyperspectral data. This application includes a reliable technique for processing distinct pixel signatures in relation to spectral wavelength. Evolutionary Algorithm techniques include considerations of signature preprocessing and non parametric searching according to model based constraints as applied to hyperspectral imagery data.

Tens of thousands of iterations are required for each and every pixel of a hyperspectral image when applying Evolutionary Computing techniques. This necessity results in a very slow computation process. A reasonably sized hyperspectral image might require millions and millions of iterations. Therefore a fast process for hyperspectral imagery exploitation and accurate unmixing is required.

SUMMARY OF THE PRESENT INVENTION

A main objective of the present invention is to provide a hybrid approach which uses robust filtering techniques to perform fast pixel unmixing with hyperspectral imagery, and genetic algorithm so as to fine the abundance estimation derived by the robust filter.

Another objective of the present invention is to provide a hybrid approach which uses robust filtering techniques to perform fast pixel unmixing with hyperspectral imagery, and genetic algorithm so as to derive accurate abundance estimation when the estimation error of the robust filter is larger than a preset threshold.

Another objective of the present invention is to provide a hybrid approach which uses robust Kalman filter to perform fast pixel unmixing with hyperspectral imagery, and genetic algorithm to fine the abundance estimation derived by the robust filter.

Another objective of the present invention is to provide a hybrid approach which uses robust Kalman filter to perform fast pixel unmixing with hyperspectral imagery, and genetic algorithm to derive accurate abundance estimation when the estimation error of the robust filter is larger than a preset threshold.

DETAILED DESCRIPTION OF THE PREFERRED EMBODIMENT

Figure 1:
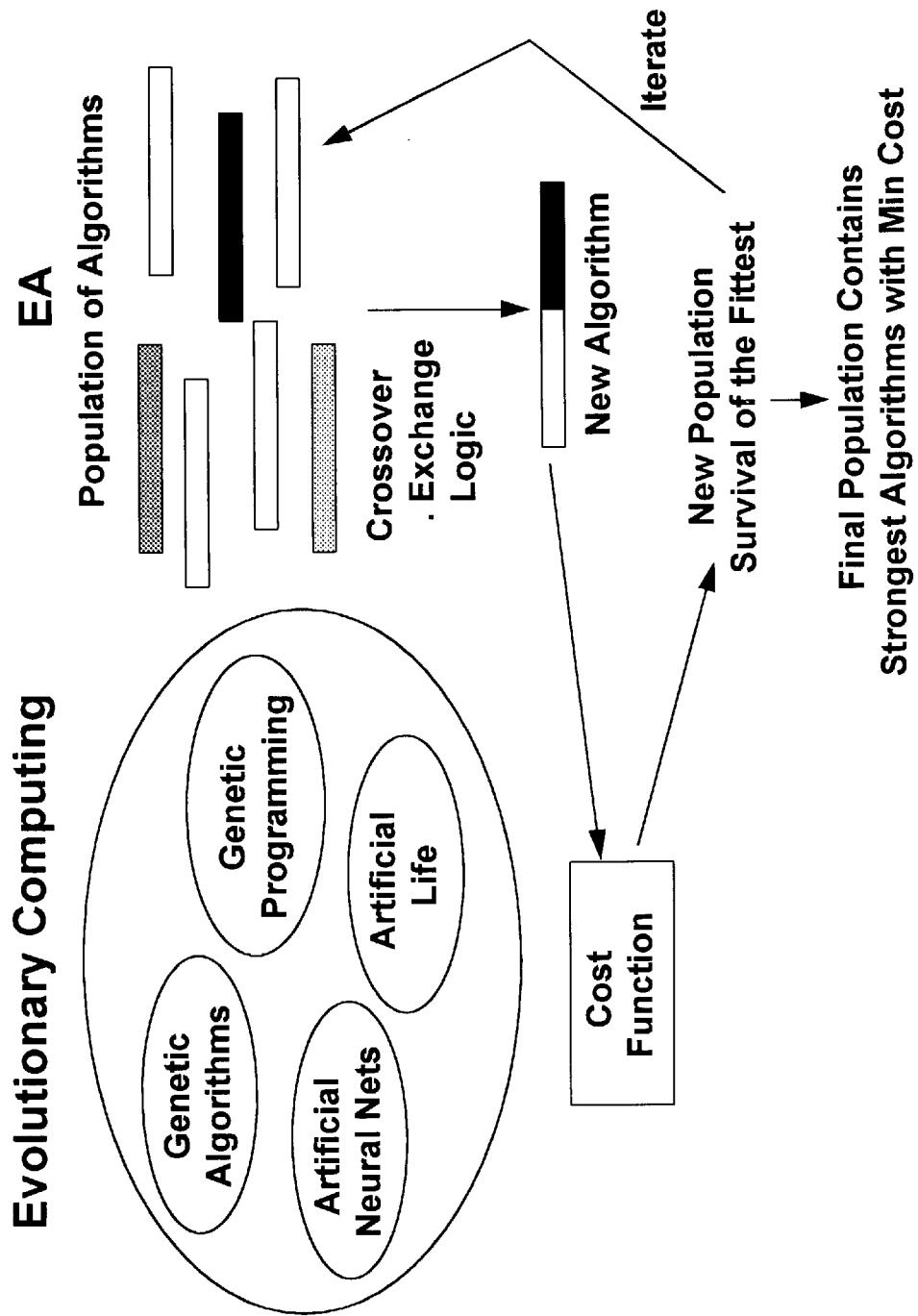
FIG. 1 is a block diagram illustrating the procedure of the evolutionary computing.
Figure 2:
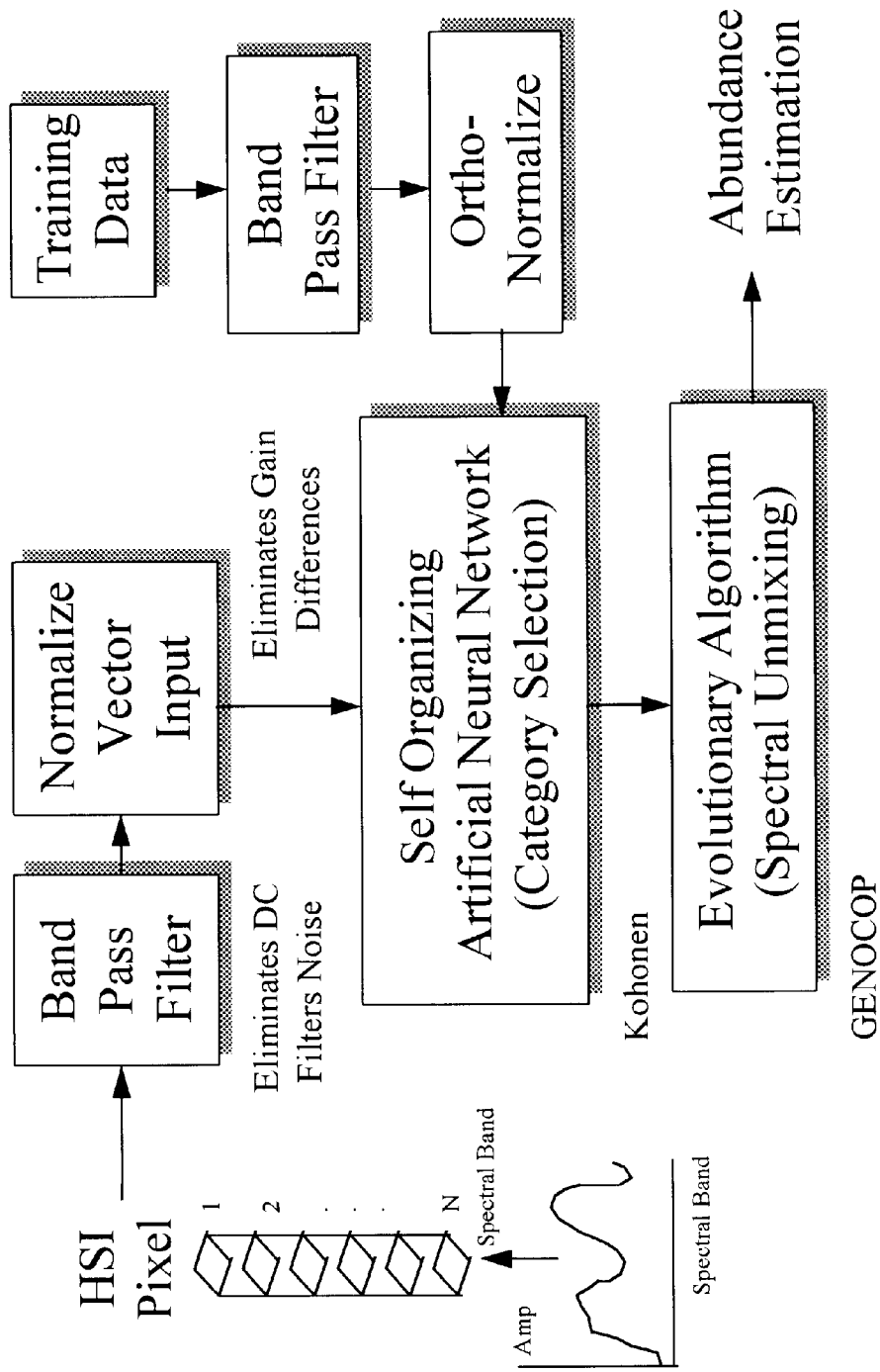
FIG. 2 is a block diagram illustrating the procedure of the spectral unmixing using evolutionary computing methods with hyperspectral imagery.

The present invention provides an efficiently hybrid approach to exploit hyperspectral imagery and unmix spectral pixels. This hybrid approach uses a genetic algorithm to solve the abundance vector for the first pixel of a hyperspectral image cube. This abundance vector is used as initial state in a Kalman filter to derive the abundance estimate for the next pixel using Kalman filtering technique. By using Kalman filter, the abundance estimate for a pixel can be obtained in one Kalman filtering procedure which is much fast than genetic algorithm.

The output of the Kalman filter is fed to genetic algorithm again to derive accurate abundance estimate for the current pixel. The using of Kalman solution as starting point of the genetic algorithm speeds up the evolution of the genetic algorithm. After obtaining the accurate abundance estimate, the procedure goes to next pixel, and uses the output of genetic algorithm as the previous state estimate to derive abundance estimate for this pixel using Kalman filter. And, again, use the genetic algorithm to derive accurate abundance estimate efficiently based on the Kalman solution. This iteration continues until pixels in a hyperspectral image cube end.

The idea of Kalman filter is relatively efficient. First, assume that there is a system that is described by its state vector x(k). In the application of hyperspectral imagery exploitation, the state vector is the endmember abundance vector. We can not observe the state vector directly, but we do have observation data z(k) that is corrupted by noise v(k). This observation data, i.e. measurement data for a pixel, is related to the state of system by the measurement equation that is given as follow:

$$z(k)=h(x(k))+v(k)$$

The index k is used instead of (x,y) to represent the pixel to be processed at the time k. In above equation, v(k) is the measurement noise with a variance of R(k), and h(x) is a vector function which describes the relationship between the measurement data for a pixel with the abundance vector.

Assume there are c types of materials and n spectral bands/channels. In general, assume n is larger than or equal to c to meet the condition of identifiability. According to the linear mixture model of the hyperspectral imagery, h(x) is represented by a n by c matrix S. This yields a linear measurement equation:

$$z(k)=Sx(k)+v(k)$$

Kalman filtering is a minimum mean-squared estimator and has two distinct features. The first feature is that Kalman filtering is based on state-space concept. This feature allows Kalman filtering to process the system as a whole unit as opposed to a group of individual components. The second feature is that Kalman filtering is recursive. The update of the estimate of the state is computed from the current estimate and the current input data. This property makes Kalman filtering more efficient than computing the estimate from the entire past input data at each step of the filtering process.

The advantages of using Kalman filtering to unmixing of hyperspectral imagery include: (1) taking advantage of the relationship of the abundance vector between adjacent pixels to estimate the percentage of material involved in a pixel accurately; (2) processing one pixel using only one Kalman iteration which leads to efficient exploitation of hyperspectral imagery.

In many information extraction applications, the propagation of internal dynamic system states not directly measured by sensors is usually described by nonlinear continuous-time differential equations, based upon physical laws, as follows, $$x(t)=f(x(t))+w(t)$$

where x(t) is the state vector, f(x) is a vector nonlinear function describing the system dynamics, and w(t) is the system noise with a covariance matrix Q(t).

In order to perform Kalman filtering for hyperspectral image unmixing a state equation is required. This equation must relate the abundance vector of the current pixel x(k) to the abundance vector of the previous pixel state x(k−1). Based on the above equation this relationship is given by $$x(k+1)=\Phi(k+1,k)x(k)+w(k)$$

where $\Phi(k-1,k)$ is c by c state transition matrix relates the state of the system at pixel k to pixel k+1.

Figure 3:
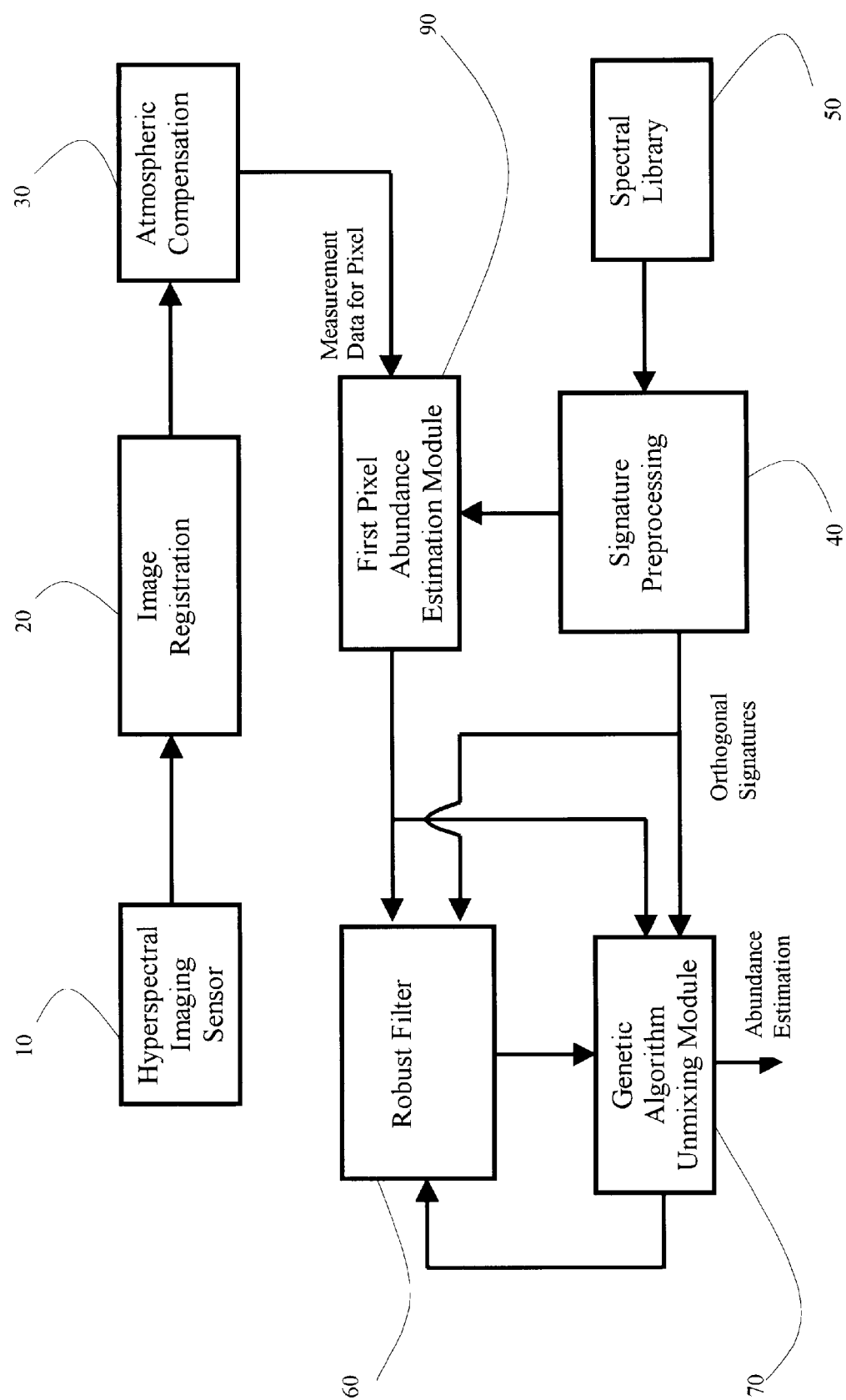
FIG. 3 is a functional block diagram illustrating the preferred implementation of the hybrid approach used for hyperspectral imagery exploitation and pixel unmixing according to the present invention.

Accordingly, referring to FIG. 3, the hybrid approach of the present invention for hyperspectral unmixing comprises the following steps.

(a) Receive a hyperspectral image cube from a hyperspectral imaging sensor 10, wherein the hyperspectral image cube represents a scene in terms of wavelength and spatial position (x,y).

(b) Register image data band to band in an image registration module 20, wherein the operation of registering is the process of "making one band image transform to another band image" without necessarily involving a map coordinate system transformation.

This step assures the physical position corresponding to one pixel in one band image coincides with that in another band image.

(c) Send the registered hyperspectral image cube to an atmospheric compensation module 30 for compensating atmosphere effects in the atmospheric compensation module 30.

In this step the atmospheric correction can be done by using a commercial off-the-shelf (COTS) software called FLAASH (Fast Line-of-sight Atmospheric Analysis of Spectral Hypercubes). FLAASH is an MODTRAN-based "atmospheric correction" software package which was developed by the Air Force Phillips Laboratory, Hanscom AFB and Spectral Sciences, Inc, to support current and planned infrared-visible-ultravoilet hyperspectral and multispectral sensors. This software provides accurate, physical-based derivation of surface and atmospheric properties such as surface albedo, surface altitude, water vapor column, aerosol and cloud optical depths, surface and temperatures.

(d) Receive spectral signatures of material of interest from a spectral library 50, and preprocess the signatures in a signature preprocessing module 40.

The spectral library is a database of known materials and objects which is populated with their signatures. These signatures obtained in laboratory are the reflectance corresponding to individual material in terms of wavelength.

The signatures from the spectral library are orthonormalized in the signature preprocessing module 40. This procedure produces a decomposition of feature space into a collection of orthonormal vectors that are linear combinations of known material or objects.

(e) Receive the orthogonal signatures from the signature preprocessing module 40 and the measurement data for the first pixel from the atmospheric compensation module 30 by a first pixel abundance estimation module 90, and calculate the abundance vector for the first pixel.

This abundance estimation for the first pixel will be used as initial value for the robust filter 60. For pixel except from the first pixel, the first pixel abundance estimation module 90 just bypasses the measurement data from the atmospheric compensation module 30.

There are different algorithms can be used to estimate the abundance vector for the first pixel. Candidates include Least Square (LS) estimator, Maximum Likelihood (ML), and evolutionary algorithm (EA).

(f) Receive the orthogonal signatures from the signature preprocessing module 40 and the measurement data for current pixel from the atmospheric compensation module 30, and abundance estimate for the first pixel from the first pixel abundance estimation module 90 by a robust filter 60 and perform spectral unmixing for current pixel using Kalman filtering technique. The robust filter 60 output the abundance estimation for current pixel to the genetic algorithm unmixing module 70.

(g) Receive the orthogonal signatures from the signature preprocessing module 40 and the measurement data for the current pixel from the atmospheric compensation module 30, and the abundance estimate for current pixel from the robust filter 60 by the genetic algorithm unmixing module 70, and perform accurate spectral unmixing for current pixel using genetic algorithm to derive accurate abundance estimation.

This accurate abundance estimation is the system's output. At the same time, it is fed back to the robust filter 60 to be used as new initial value for abundance estimation for next pixel in the robust filter.

In this step, the output of the robust filter 60 is used as the starting point for the genetic algorithm unmixing module 70 to accelerate the evolution of the genetic algorithm.

(h) Go to next pixel, and receive the orthogonal signatures from the signature preprocessing module 40 and the measurement data for current pixel from the atmospheric compensation module 30, and abundance estimate for the previous pixel from the genetic algorithm unmixing module 70 by the robust filter 60 and perform spectral unmixing for current pixel using Kalman filtering technique. In this step, the accurate abundance estimation from the genetic algorithm unmixing module 70 is used as abundance estimation for previous pixel in the robust filter 60 to estimate accurately the abundance vector for current pixel.

(i) Go back to the step (g) and iterate steps (g) and (h) until pixel ends in one hyperspectral image cube.

It is worth to note that the robust filter 60 and the genetic algorithm can run in parallel fashion.

Figure 4:
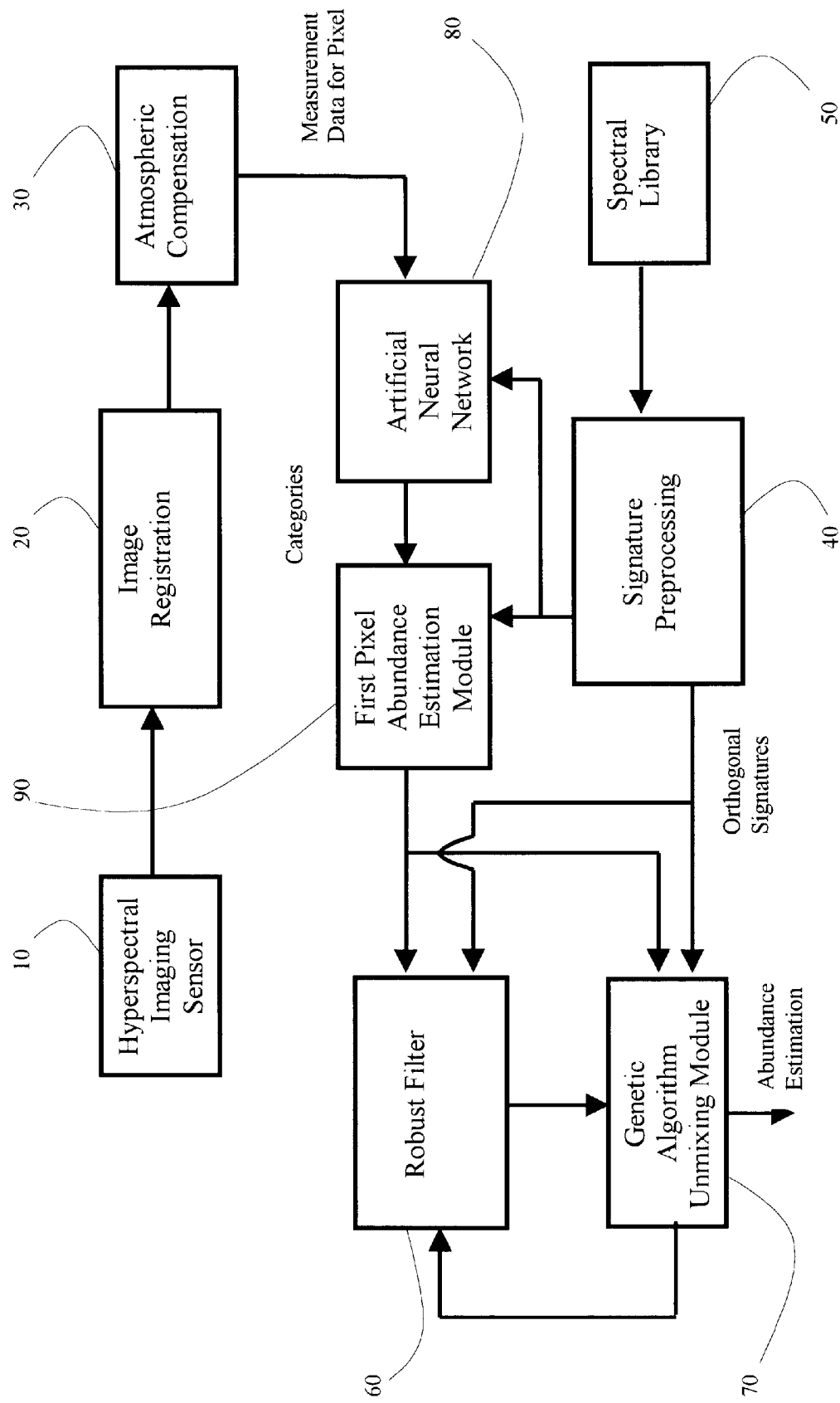
FIG. 4 is a functional block diagram illustrating the second preferred implementation of the hybrid approach used for hyperspectral imagery exploitation and pixel unmixing according to the present invention.

As shown in FIG. 4, alternatively, after the step (d), a further step of material category selection using an artificial neural network module 80 is included. This step can reduce the elements of abundance vector to speed up the hyperspectral imagery exploitation. Therefor, after the step (d) the process of the present invention comprises the following steps.

(e') Receive the orthogonal signatures from the signature preprocessing module 40 and the measurement data from the atmospheric compensation module 30 by an artificial neural network 80 and perform material category selection. The categories are sent to an genetic algorithm unmixing module 70 and a robust filter 60. The categories for the first pixel is also sent to a first pixel abundance estimation module 90. At the same time, the artificial neural network 80 bypasses the measurement data from the atmospheric compensation module 30 to following modules.

The orthonormal vectors (unit magnitude) from the signature preprocessing module 40 are referred to as categories and are used by the artificial neural network 80 to correlate sensed data. The corrected input data for a pixel from the atmospheric compensation module 30 is processed by the artificial neural network to estimate the degree of correlation between the input signature and known category signatures from the spectral library.

The output of all neurons in the fuzzy neural network is assessed to see if any neuron has a response that exceeds a preset value, for example 0.5 (neuron output range is 0.0~1.0). If one or more neurons in the network have a response that exceeds the preset value, then the category that corresponds to that neuron is selected as a candidate for subsequent processing. The advantage of the category selection is that only abundance of material involved in the current pixel goes into the state vector as an element in the Kalman filter and genetic algorithm. This step reduces the elements of abundance vector so that the process is speeded up.

(f) Receive the orthogonal signatures from the signature preprocessing module 40, the measurement data for the first pixel from the atmospheric compensation module 30, and the categories for the first pixel from the artificial neural network 80 by the first pixel abundance estimation module 90, and calculate the abundance vector for the first pixel. This abundance estimation for the first pixel will be used as initial value for the robust filter 60. For pixel except from the first pixel, the first pixel abundance estimation module 90 just bypasses the measurement data from the artificial neural network 80.

There are different algorithms can be used to estimate the abundance vector for the first pixel. Candidates include Least Square (LS) estimator, Maximum Likelihood (ML), and genetic algorithm (GA).

(g') Receive the orthogonal signatures from the signature preprocessing module 40 and the measurement data for current pixel from the atmospheric compensation module 30, the categories from the artificial neural network 80, and abundance estimate for the first pixel from the first pixel abundance estimation module 90 by the robust filter 60 and perform spectral unmixing for current pixel using Kalman filtering technique. The robust filter 60 output the abundance estimation for current pixel to the genetic algorithm unmixing module 70.

(h') Receive the orthogonal signatures from the signature preprocessing module 40 and the measurement data for the current pixel from the atmospheric compensation module 30, the categories from the artificial neural network 80, and the abundance estimate for current pixel from the robust filter 60 by the genetic algorithm unmixing module 70, and perform accurate spectral unmixing for current pixel using genetic algorithm to derive accurate abundance estimation. This accurate abundance estimation is the system's output. At the same time, it is fed back to the robust filter 60 to be used as new initial value for abundance estimation for next pixel in the robust filter. In this step, the output of the robust filter 60 is used as the starting point for the genetic algorithm unmixing module 70 to accelerate the evolution of the genetic algorithm.

(i') Go to next pixel, and receive the orthogonal signatures from the signature preprocessing module 40 and the measurement data for current pixel from the atmospheric compensation module 30, the categories from the artificial neural network 80, and abundance estimate for the previous pixel from the genetic algorithm unmixing module 70 by the robust filter 60 and perform spectral unmixing for current pixel using Kalman filtering technique. In this step, the accurate abundance estimation from the genetic algorithm unmixing module 70 is used as abundance estimation for previous pixel in the robust filter 60 to estimate accurately the abundance vector for current pixel.

(j') Go back to step (h') and iterate steps (h') and (i') until pixel ends in one hyperspectral image cube.

In some applications, the speed is the top priority concern where the accuracy of the abundance estimation becomes the second level consideration, then the step (g) can be replaced by the following procedure:

Evaluate the estimation error for the abundance vector of the current pixel. If the estimation error is larger than a preset threshold, then do step (g). The estimation error is given by the covariance matrix of the robust filter. Otherwise, the genetic algorithm unmixing module 70 just bypasses the solution derived by the robust filter 60.

Similarly, the step (h') can be replaced by the following procedure:

Evaluate the estimation error for the abundance vector of the current pixel. If the estimation error is larger than a preset threshold, then do step (h'). The estimation error is given by the covariance matrix of the robust filter. Otherwise, the genetic algorithm unmixing module 70 just bypasses the solution derived by the robust filter 60.

Figure 7:
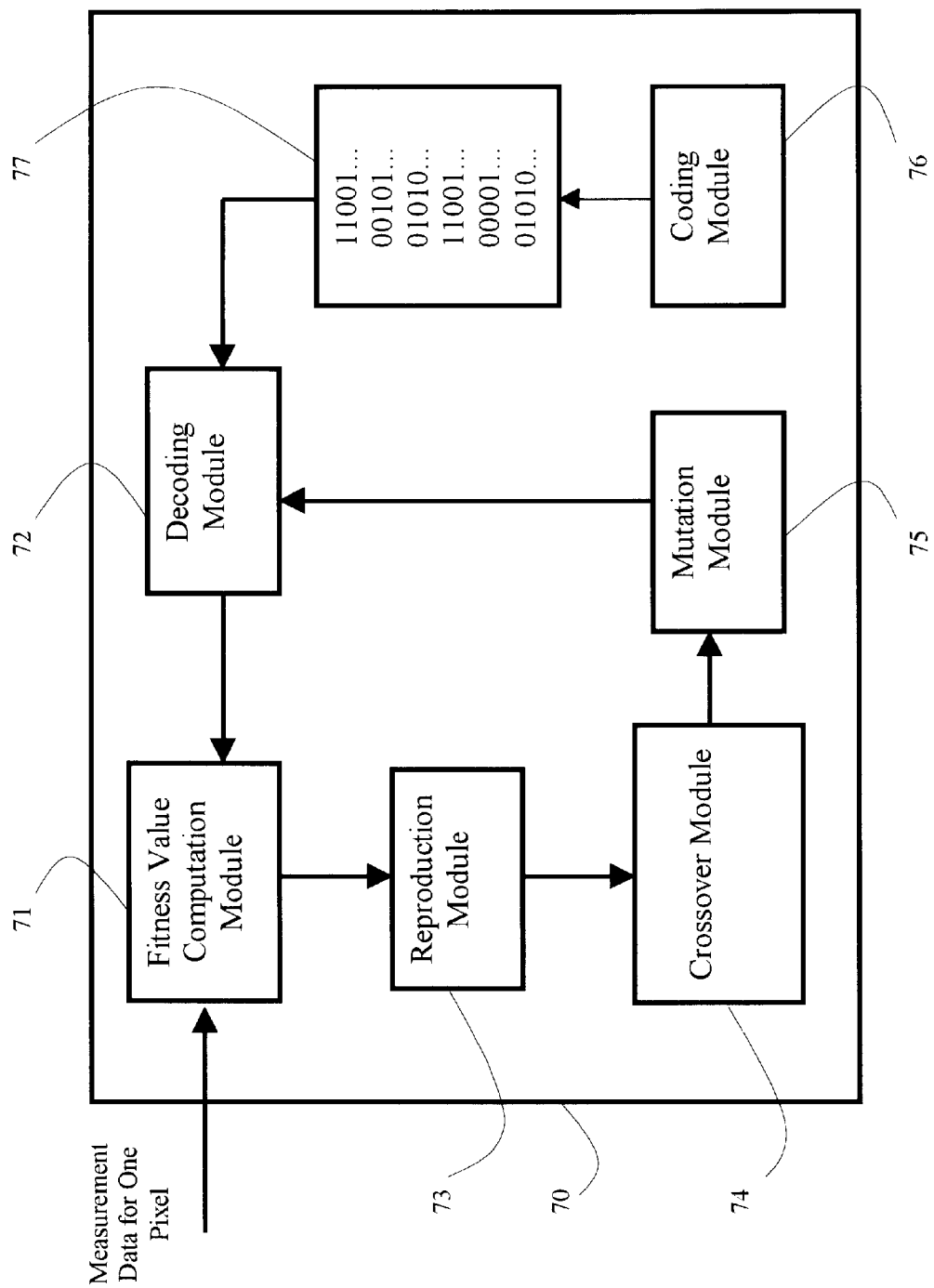
FIG. 7 is a functional block diagram illustrating the implementation of a genetic algorithm for hyperspectral imagery pixel unmixing according to the present invention.

Referring to FIG. 7, the genetic algorithm unmixing procedure of the genetic algorithm unmixing module 70 further comprises the following steps.

(1) Generate randomly a population of binary strings 77 by a coding module 76 which represent the abundance vector related to a pixel of a hyperspectral cube. Genetic algorithm works with a population of binary strings, not the abundance vector themselves. The binary strings are sent to a decoding module 72.

(2) Decode the population of binary strings 77 by the decoding module 72. The output of the decoding module is a population of the abundance vector related to a pixel of a hyperspectral cube which is sent to a fitness value computation module 71. This abundance vector gives the percentage of each material of interest involved in this pixel.

(3) Compute fitness value on each abundance vector by the fitness value computation module 71. In the fitness value computation module, a cost function takes a binary string called chromosome and returns a value. The value of the cost is then mapped into a fitness value so as to fit into the genetic algorithm. The fitness value is a reward based on the performance of the possible solution represented by the string. The better the solution (abundance vector) encoded by a string (chromosome), the higher the fitness. The fitness values are sent to a reproduction module 73.

(4) Perform reproduction in the reproduction module 73 based on the fitness values output from the fitness value computation module 71. Reproduction is based on the principle of survival of the better fitness. These strings with large fitness would have a large number of copies in the new generation. Once the strings are reproduced or copied for possible use in the next generation, they are reproduced in a mating pool where they await the action of the other two operators, crossover and mutation.

(5) Generate a population of offspring by exchanging tails and heads of strings (chromosomes) in a crossover module 74. Crossover provides a mechanism for strings to mix and match their desirable qualities through a random process. First, two newly reproduced strings are selected from the mating pool produced by the reproduction module 73. Second, a position along the two strings is selected uniformly at random. Third, all characters following the crossing sit are exchanged. Although crossover uses random choice, it should not be thought of as a random walk through the search space. When combined with reproduction, it is an effective means of exchanging information and combining portions of high-quality solutions.

(6) Alternate occasionally a value at a particular string position in a mutation module 75. This step is to enhance an ability of genetic algorithm to find a near-optimal solution. Mutation is an insurance policy against the permanent loss of any simple bit, and it is applied with a low probability such that it is chosen so that on average one string in the population is mutated.

(7) Send the new population of binary strings to the decoding module 72, then do steps (2), (3), (4), (5), (6), and (7).

In step (3), a discrimination is performed to determine whether to stop evolution or not. The discrimination criteria can be defined as a number of total evolution generations. When the genetic algorithm iterates to the number of total evolution generations, the binary string with highest fitness is selected as the solution. Its corresponding abundance vector is the abundance estimate of the pixel. The discrimination can also performed by evaluating the difference between the strings. If the difference between the binary string is less than a preset value, then quit evolution. Again, the string with highest fitness will be chosen as the solution.

Since the Kalman filter produces optimal estimates with well defined statistical properties, the estimates are unbiased and they have minimum variance within the class of linear unbiased estimates. The quality of the estimates is, however, only guaranteed as long as the assumptions underlying the mathematical model hold. Any misspecification in the model may invalidate the results of filtering and thus also any conclusion based on them.

In the hybrid approach of the present invention, an alternative for a robust filter for hyperspectral unmixing is a universal robust Kalman filter. This universal robust Kalman filter is stable enough to operate in more than one dynamical environment/system.

Figure 5:
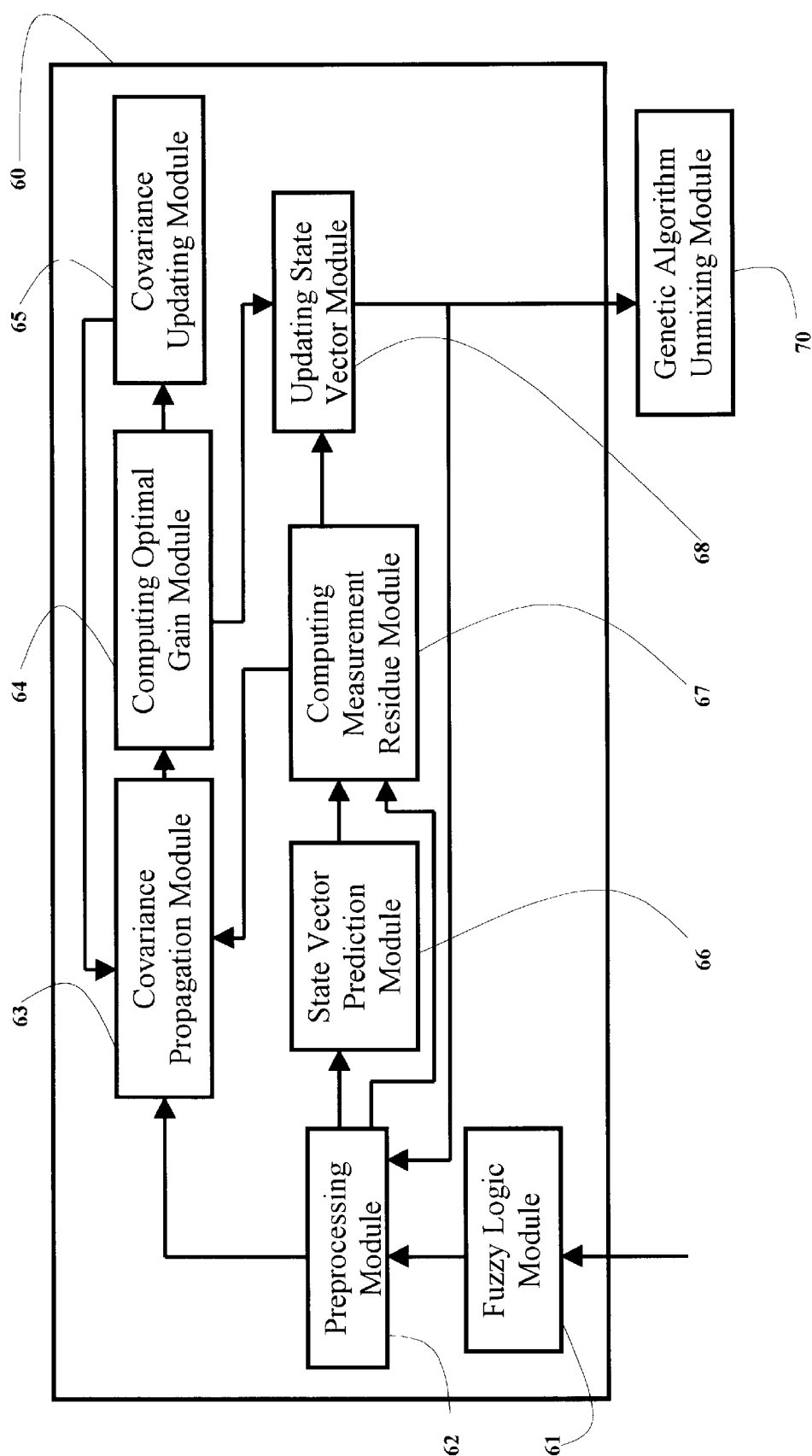
FIG. 5 is a functional block diagram illustrating the implementation of a robust Kalman filter for hyperspectral imagery pixel unmixing according to the present invention.

Referring to FIG. 5, the universal robust filtering process for hyperspectral unmixing comprises of the steps as follows:

(f.1) Receive measurement data for a pixel from the atmospheric compensation module 30.

(f.2) Validate the measurement data using fuzzy logic inference process in a fuzzy logic module 61, wherein the fuzzy logic inference process is used to decide to reject the measurement data, or correct it according to the fuzzy logic rules, or approve the measurement data.

(f.3) Output correct measurement data or bad measurement flag to a preprocessing module 62, wherein the preprocessing module 62 performs the calculation of the state transit matrix, and the measurement matrix.

(f.4) Send the calculated state transit matrix from the preprocessing module 62 to a state vector prediction module 66, and send a previous state vector from an updating state vector module 68 to the state vector prediction module 66, wherein the state vector prediction module 66 performs state vector prediction, i.e. the abundance vector for the next pixel.

(f.5) Send the calculated state transit matrix from the preprocessing module 62 to a covariance propagation module 63, wherein the covariance propagation module 63 computes the current covariance of the estimated error.

(f.6) Send the measurement matrix and the current measurement vector from the preprocessing module 62 to a computing measurement residue module 67, wherein the computing measurement residue module 67 receives the predicted state vector from the state vector prediction module 66 and performs the measurement residue computing by subtracting the multiplication of the measurement matrix and the predicted current state from the current measurement vector.

(f.7) Send the current covariance of the estimated error from the covariance propagation module 63 to a computing optimal gain module 64, wherein the computing optimal gain module 64 performs the computation of the optimal gain.

(f.8) Send the optimal gain from the computing optimal gain module 64 to a covariance updating module 65, wherein the covariance updating module 65 updates the covariance of the estimated error.

(f.9) Send the updated covariance of the estimated error from the covariance updating module 65 to the covariance propagation module 63.

(f.10) Send the optimal gain from the computing optimal gain module 64 to the updating state vector module 68, wherein the updating state vector module 68 receives the measurement residue from the computing measurement residue module 66 and performs the state vector updating, i.e. the abundance vector for the next pixel.

Figure 6:
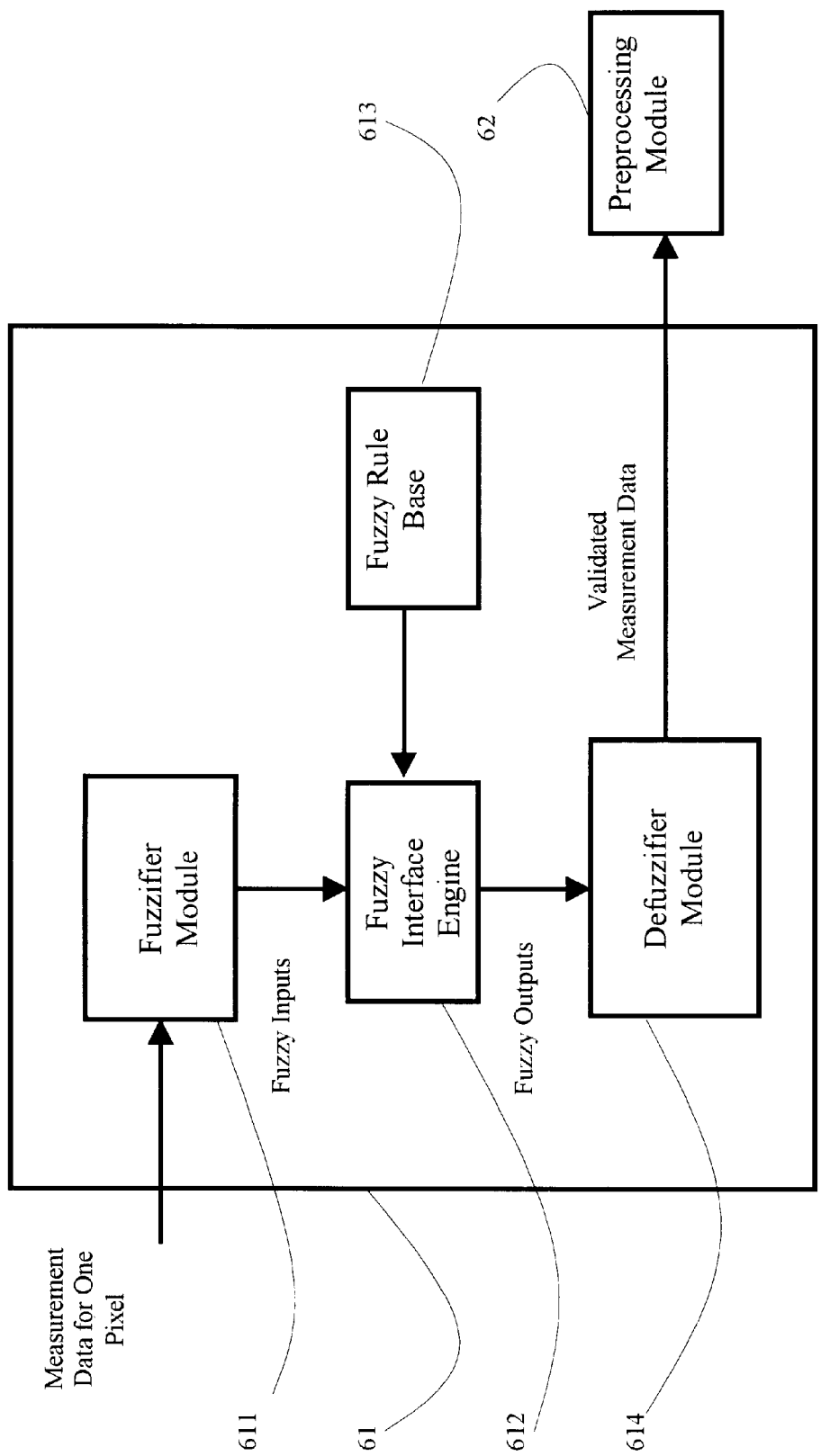
FIG. 6 is a functional block diagram illustrating the implementation of the fuzzy logic module according to the present invention.

Referring to FIG. 6, the step (f.2) further comprises the steps as follows:

(f.2-1) Send the measurement data to a fuzzifier module 611, wherein the fuzzifier performs a scale mapping that transfers the range of measurement into a corresponding universe of discourse, and performs the fuzzification that converts the measurement data into suitable linguistic values which are labeled as fuzzy sets and interprets a crisp measurement data as a fuzzy set with a membership function belonging to [0, 1] for obtaining fuzzy input.

(f.2-2) Send the fuzzy input from the fuzzifier module 611 to a fuzzy interface engine 612, wherein the fuzzy interface engine 612 basically simulates human decision making procedures and infers fuzzy outputs employing fuzzy implication and the fuzzy logic inference rules.

The fuzzy logic inference rules from the fuzzy rule base 613 characterizes the goals and policy of the domain of experts by means of a set of linguistic rules. The fuzzy rule base comprises the knowledge of the application domain and the attendant goals.

(f.2-3) Send the fuzzy outputs from the fuzzy interface engine 612 to a defuzzifier module 614, wherein the defuzzifier module 614 generates a crisp validated measurement data that best represents the possibility distribution of an inferred fuzzy outputs.

What is claimed is:

1. A method for hyperspectral imagery exploitation and pixel spectral unmixing, comprising the steps of:
   (a) receiving a hyperspectral image cube from a hyperspectral imaging sensor, wherein said hyperspectral image cube represents a scene in terms of wavelength and spatial position;
   (b) performing an image registration from band to band in an image registration module, wherein said image registration is a process of making one band image transforming to another band image without involving a map coordinate system transformation, so as to assure a physical position corresponding to one pixel in one band image coinciding with that in another band image;
   (c) sending said hyperspectral image cube registered in said image registration module to an atmospheric compensation module for compensating atmosphere effects in said atmospheric compensation module; and
   (d) unmixing hyperpsectral imagery data using genetic algorithm and robust Kalman filtering techniques, in a pixel by pixel fashion, until said hyperspectral image cube is completed, wherein the step (d) further comprises the steps of:
      (d-1) receiving spectral signatures of material of interest from a spectral library, and preprocessing said spectral signatures in a signature preprocessing module, wherein said spectral signatures from said spectral library are orthonormalized in said signature preprocessing module, so as to produce a decomposition of feature space into a collection of orthonormal signatures;

(d-2) receiving said orthogonal signatures from said signature preprocessing module and a set of measurement data for a first pixel from said atmospheric compensation module by a first pixel abundance estimation module, and calculating an abundance estimation for said first pixel, wherein for pixel except from said first pixel, said first pixel abundance estimation module just bypasses said measurement data from said atmospheric compensation module;

(d-3) receiving said orthogonal signatures from said signature preprocessing module and said measurement data for current pixel from said atmospheric compensation module, and said abundance estimate for said first pixel from said first pixel abundance estimation module by a Kalman filter, and performing spectral unmixing for said current pixel using Kalman filtering technique, wherein said abundance estimation for said first pixel is used as initial value for said Kalman filter which outputs an abundance estimation for said current pixel;

(d-4) receiving said orthogonal signatures from said signature preprocessing module and said measurement data for said current pixel from said atmospheric compensation module, and said abundance estimation for said current pixel from said Kalman filter by a genetic algorithm unmixing module, and performing accurate spectral unmixing for said current pixel using said genetic algorithm to derive an accurate abundance estimation;

(d-5) going to a next pixel, and receiving said orthogonal signatures from said signature preprocessing module and said measurement data for said current pixel from said atmospheric compensation module, and said accurate abundance estimate for the previous pixel from said genetic algorithm unmixing module by said Kalman filter, and performing spectral unmixing for said current pixel using Kalman filtering technique; and (d-6) going back to step (d-4) and iterating steps (d-4) and (d-5) until pixel ends in said hyperspectral image cube.

2. A method for hyperspectral imagery exploitation and pixel spectral unmixing, as recited in claim 1, wherein, in the step (d-4), said accurate abundance estimation is a system output, and said accurate abundance estimation for said current pixel is fed back to said Kalman filter to be used as new initial value for another abundance estimation for said next pixel in said Kalman filter, wherein an output of said Kalman filter is used as a starting point for said genetic algorithm unmixing module to accelerate the evolution of the genetic algorithm.

3. A method for hyperspectral imagery exploitation and pixel spectral unmixing, as recited in claim 2, wherein, in the step (d-5), said accurate abundance estimation from said genetic algorithm unmixing module is used as abundance estimation for said previous pixel in said Kalman filter to estimate accurately the abundance vector for said current pixel.

4. A method for hyperspectral imagery exploitation and pixel spectral unmixing, as recited in claim 3, wherein, in the step (d-2), said parameter estimator for calculation of said abundance estimation for said first pixel is a Least Square (LS) estimator.

5. A method for hyperspectral imagery exploitation and pixel spectral unmixing, as recited in claim 3, wherein, in the step (d-2), said parameter estimator for calculation of said abundance estimation for said first pixel is a Maximum Likelihood (ML) estimator.

6. A method for hyperspectral imagery exploitation and pixel spectral unmixing, as recited in claim 3, wherein, in the step (d-2), said parameter estimator for calculation of said abundance estimation for said first pixel is an evolutionary algorithm.

7. A method for hyperspectral imagery exploitation and pixel spectral unmixing, as recited in claim 1, said Kalman filter is a universal robust Kalman filter.

8. A method for hyperspectral imagery exploitation and pixel spectral unmixing, as recited in claim 7, wherein said universal robust Kalman filter processes the steps of:

(f.1) receiving said measurement data for said pixel from said atmospheric compensation module;

(f.2) validating said measurement data using a fuzzy logic inference process in a fuzzy logic module, wherein said fuzzy logic inference process is used to decide selectively to reject said measurement data, to correct said measurement data according to a plenty of fuzzy logic rules, and to approve said measurement data;

(f.3) outputting said corrected measurement data or a bad measurement flag to a preprocessing module, wherein said preprocessing module performs the calculation of a state transit matrix and a measurement matrix;

(f.4) sending said state transit matrix from said preprocessing module to a state vector prediction module, sending a previous state vector from an updating state vector module to said state vector prediction module, wherein said state vector prediction module performs state vector prediction, that is said abundance estimation for said next pixel;

(f.5) sending said state transit matrix from said preprocessing module to a covariance propagation module, wherein said covariance propagation module computes a current covariance of an estimation error;

(f.6) sending said measurement matrix and a current measurement vector from said preprocessing module to a computing measurement residue module, wherein said computing measurement residue module receives said predicted state vector from said state vector prediction module and performs computation of a measurement residue by subtracting the multiplication of said measurement matrix and said predicted current state from said current measurement vector;

(f.7) sending said current covariance of said estimation error from said covariance propagation module to a computing optimal gain module, wherein said computing optimal gain module performs the computation of an optimal gain;

(f.8) sending said optimal gain from said computing optimal gain module to a covariance updating module, wherein said covariance updating module updates said covariance of said estimation error;

(f.9) sending said updated covariance of said estimation error from said covariance updating module to said covariance propagation module; and (f.10) sending said optimal gain from said computing optimal gain module to said updating state vector module, wherein said updating state vector module receives said measurement residue from said computing measurement residue module and performs the state vector updating, that is said abundance estimation for said next pixel.

9. A method for hyperspectral imagery exploitation and pixel spectral unmixing, as recited in claim 8, wherein the step (f.2) comprises the steps of:

(f.2-1) sending said measurement data to a fuzzifier module, wherein said fuzzifier performs a scale mapping that transfers the range of said measurement data into a corresponding universe of discourse, and performs the fuzzification that converts said measurement data into suitable linguistic values which are labeled as fuzzy sets; and interprets a crisp measurement data as a fuzzy set with a membership function belonging to [0, 1] for obtaining fuzzy input;

(f.2-2) sending said fuzzy input from said fuzzifier module to a fuzzy interface engine, wherein said fuzzy interface engine basically simulates human decision making procedures and infers fuzzy outputs employing fuzzy implication and the fuzzy logic inference rules, wherein said fuzzy logic inference rules from a fuzzy rule base characterizes the goals and policy of the domain of experts by means of a set of linguistic rules, wherein said fuzzy rule base comprises the knowledge of the application domain and the attendant goals; and (f.2-3) sending said fuzzy outputs from said fuzzy interface engine to a defuzzifier module, wherein said defuzzifier module generates a crisp validated measurement data that best represents the possibility distribution of inferred fuzzy outputs.

10. A method for hyperspectral imagery exploitation and pixel spectral unmixing, as recited in claim 3, said Kalman filter is a universal robust Kalman filter.

11. A method for hyperspectral imagery exploitation and pixel spectral unmixing, as recited in claim 10, wherein said universal robust Kalman filter processes the steps of:

(f.1) receiving said measurement data for said pixel from said atmospheric compensation module;

(f.2) validating said measurement data using a fuzzy logic inference process in a fuzzy logic module, wherein said fuzzy logic inference process is used to decide selectively to reject said measurement data, to correct said measurement data according to a plenty of fuzzy logic rules, and to approve said measurement data;

(f.3) outputting said corrected measurement data or a bad measurement flag to a preprocessing module, wherein said preprocessing module performs the calculation of a state transit matrix and a measurement matrix;

(f.4) sending said state transit matrix from said preprocessing module to a state vector prediction module, sending a previous state vector from an updating state vector module to said state vector prediction module, wherein said state vector prediction module performs state vector prediction, that is said abundance estimation for said next pixel;

(f.5) sending said state transit matrix from said preprocessing module to a covariance propagation module, wherein said covariance propagation module computes a current covariance of an estimation error;

(f.6) sending said measurement matrix and a current measurement vector from said preprocessing module to a computing measurement residue module, wherein said computing measurement residue module receives said predicted state vector from said state vector prediction module and performs computation of a measurement residue by subtracting the multiplication of said measurement matrix and said predicted current state from said current measurement vector;

(f.7) sending said current covariance of said estimation error from said covariance propagation module to a computing optimal gain module, wherein said computing optimal gain module performs the computation of an optimal gain;

(f.8) sending said optimal gain from said computing optimal gain module to a covariance updating module, wherein said covariance updating module updates said covariance of said estimation error;

(f.9) sending said updated covariance of said estimation error from said covariance updating module to said covariance propagation module; and (f.10) sending said optimal gain from said computing optimal gain module to said updating state vector module, wherein said updating state vector module receives said measurement residue from said computing measurement residue module and performs the state vector updating, that is said abundance estimation for said next pixel.

12. A method for hyperspectral imagery exploitation and pixel spectral unmixing, as recited in claim 11, wherein the step (f.2) comprises the steps of:

(f.2-1) sending said measurement data to a fuzzifier module, wherein said fuzzifier performs a scale mapping that transfers the range of said measurement data into a corresponding universe of discourse, and performs the fuzzification that converts said measurement data into suitable linguistic values which are labeled as fuzzy sets; and interprets a crisp measurement data as a fuzzy set with a membership function belonging to [0, 1] for obtaining fuzzy input;

(f.2-2) sending said fuzzy input from said fuzzifier module to a fuzzy interface engine, wherein said fuzzy interface engine basically simulates human decision making procedures and infers fuzzy outputs employing fuzzy implication and the fuzzy logic inference rules, wherein said fuzzy logic inference rules from a fuzzy rule base characterizes the goals and policy of the domain of experts by means of a set of linguistic rules, wherein said fuzzy rule base comprises the knowledge of the application domain and the attendant goals; and (f.2-3) sending said fuzzy outputs from said fuzzy interface engine to a defuzzifier module, wherein said defuzzifier module generates a crisp validated measurement data that best represents the possibility distribution of inferred fuzzy outputs.

13. A method for hyperspectral imagery exploitation and pixel spectral unmixing, as recited in claim 1, wherein said genetic algorithm unimixng processes the steps of:

generating randomly a population of binary strings by a coding module which represent said abundance estimation related to said pixel of said hyperspectral image cube; wherein a genetic algorithm works with said binary strings and said binary strings are sent to a decoding module;

decoding said binary strings by said decoding module, wherein an output of said decoding module is a population of said abundance estimation related to said pixel of said hyperspectral image cube which is sent to a fitness value computation module, wherein said abundance estimation gives the percentage of each material of interest involved in said pixel;

computing fitness value on each said abundance estimation by a fitness value computation module; wherein in said fitness value computation module, a cost function takes said binary string called chromosome and returns a value, wherein said value of said cost function is then mapped into a fitness value so as to fit into said genetic algorithm; wherein said fitness value is a reward based on the performance of the possible solution represented by said binary string; wherein the better said abundance estimation encoded by said binary string, the higher said fitness; wherein said fitness values are sent to a reproduction module;

performing a discrimination to determine whether to stop evolution or not, wherein a discrimination criteria is defined as a number of total evolution generations: when said genetic algorithm iterates to said number of total evolution generations, one of said binary strings with highest fitness is selected as solution and said genetic algorithm quit evolution, wherein a corresponding abundance estimation vector thereof is said abundance estimate of said pixel;

performing reproduction in said reproduction module based on said fitness values output from said fitness value computation module; wherein said reproduction is based on the principle of survival of the better fitness: said strings with large fitness would have a large number of copies in the new generation; wherein once said binary strings are reproduced for possible use in the next generation, said binary strings are reproduced in a mating pool where said binary strings await the action of the other two operators, crossover and mutation;

generating a population of offspring by exchanging tails and heads of said binary strings in a crossover module; wherein crossover provides a mechanism for said binary strings to mix and match their desirable qualities through a random process, in which, first, two newly said reproduced strings are selected from said mating pool produced by said reproduction module, second, a position along the two strings is selected uniformly at random, third, all characters following the crossing sit are exchanged;

alternating occasionally a value at a particular string position in a mutation module, wherein said mutation is an insurance policy against the permanent loss of any simple bit, and it is applied with a low probability such that it is chosen so that on average one string in the population is mutated; and sending said new population of said binary strings to said decoding module, then do the steps (2), (3), (4), (5), (6), (7), and (8).

14. A method for hyperspectral imagery exploitation and pixel spectral unmixing, as recited in claim 3, wherein said genetic algorithm unimixng processes the steps of:

generating randomly a population of binary strings by a coding module which represent said abundance estimation related to said pixel of said hyperspectral image cube; wherein a genetic algorithm works with said binary strings and said binary strings are sent to a decoding module;

decoding said binary strings by said decoding module, wherein an output of said decoding module is a population of said abundance estimation related to said pixel of said hyperspectral image cube which is sent to a fitness value computation module, wherein said abundance estimation gives the percentage of each material of interest involved in said pixel;

computing fitness value on each said abundance estimation by a fitness value computation module; wherein in said fitness value computation module, a cost function takes said binary string called chromosome and returns a value, wherein said value of said cost function is then mapped into a fitness value so as to fit into said genetic algorithm; wherein said fitness value is a reward based on the performance of the possible solution represented by said binary string; wherein the better said abundance estimation encoded by said binary string, the higher said fitness; wherein said fitness values are sent to a reproduction module;

performing a discrimination to determine whether to stop evolution or not, wherein a discrimination criteria is defined as a number of total evolution generations: when said genetic algorithm iterates to said number of total evolution generations, one of said binary strings with highest fitness is selected as solution and said genetic algorithm quit evolution, wherein a corresponding abundance estimation vector thereof is said abundance estimate of said pixel;

performing reproduction in said reproduction module based on said fitness values output from said fitness value computation module; wherein said reproduction is based on the principle of survival of the better fitness: said strings with large fitness would have a large number of copies in the new generation; wherein once said binary strings are reproduced for possible use in the next generation, said binary strings are reproduced in a mating pool where said binary strings await the action of the other two operators, crossover and mutation;

generating a population of offspring by exchanging tails and heads of said binary strings in a crossover module; wherein crossover provides a mechanism for said binary strings to mix and match their desirable qualities through a random process, in which, first, two newly said reproduced strings are selected from said mating pool produced by said reproduction module, second, a position along the two strings is selected uniformly at random, third, all characters following the crossing sit are exchanged;

alternating occasionally a value at a particular string position in a mutation module, wherein said mutation is an insurance policy against the permanent loss of any simple bit, and it is applied with a low probability such that it is chosen so that on average one string in the population is mutated; and sending said new population of said binary strings to said decoding module, then do the steps (2), (3), (4), (5), (6), (7), and (8).

15. A method for hyperspectral imagery exploitation and pixel spectral unmixing, comprising the steps of:

(a) receiving a hyperspectral image cube from a hyperspectral imaging sensor, wherein said hyperspectral image cube represents a scene in terms of wavelength and spatial position;

(b) performing an image registration from band to band in an image registration module, wherein said image registration is a process of making one band image transforming to another band image without involving a map coordinate system transformation, so as to assure a physical position corresponding to one pixel in one band image coinciding with that in another band image;

(c) sending said hyperspectral image cube registered in said image registration module to an atmospheric compensation module for compensating atmosphere effects in said atmospheric compensation module; and (d) unmixing hyperpsectral imagery data using genetic algorithm and robust Kalman filtering techniques, in a pixel by pixel fashion, until said hyperspectral image cube is completed, wherein the step (d) comprises the steps of:

(d-1) receiving spectral signatures of material of interest from a spectral library, and preprocessing said spectral signatures in a signature preprocessing module, wherein said spectral signatures from said spectral library are orthonormalized in said signature preprocessing module, so as to produce a decomposition of feature space into a collection of orthonormal signatures;

(d-2) receiving said orthogonal signatures from said signature preprocessing module and said measurement data from said atmospheric compensation module by an artificial neural network and performing material category selection, wherein said artificial neural network bypasses said measurement data from said atmospheric compensation module to following modules;

(d-3) receiving said orthogonal signatures from said signature preprocessing module, said measurement data for a first pixel from said atmospheric compensation module, and said categories for said first pixel from said artificial neural network by a first pixel abundance estimation module, and calculating an abundance estimation for said first pixel using a parameter estimator, wherein said abundance estimation for said first pixel is used as an initial value for a Kalman filter, wherein for pixel except from said first pixel, said first pixel abundance estimation module just bypasses said measurement data from said artificial neural network;

(d-4) receiving said orthogonal signatures from said signature preprocessing module and said measurement data for said current pixel from said atmospheric compensation module, said categories from said artificial neural network, and said abundance estimate for said first pixel from said first pixel abundance estimation module by said Kalman filter and perform spectral unmixing for said current pixel using Kalman filtering technique, wherein said Kalman filter outputs said abundance estimation for said current pixel;

(d-5) receiving said orthogonal signatures from said signature preprocessing module and said measurement data for said current pixel from said atmospheric compensation module, said categories from said artificial neural network, and said abundance estimate for said current pixel from said Kalman filter by a genetic algorithm unmixing module, and performing accurate spectral unmixing for said current pixel using genetic algorithm to derive an accurate abundance estimation, wherein said accurate abundance estimation is a system output, wherein an output of said Kalman filter is used as a starting point for said genetic algorithm unmixing module to accelerate the evolution of the genetic algorithm, wherein said accurate abundance estimation is fed back to said Kalman filter to be used as a new initial value for abundance estimation for a next pixel in said Kalman filter;

(d-6) going to said next pixel, and receiving said orthogonal signatures from said signature preprocessing module and said measurement data for said current pixel from said atmospheric compensation module, said categories from said artificial neural network, and said abundance estimate for the previous pixel from said genetic algorithm unmixing module by said Kalman filter, and performing spectral unmixing for said current pixel using Kalman filtering technique, wherein said accurate abundance estimation from said genetic algorithm unmixing module is used as abundance estimation for previous pixel in said Kalman filter to estimate accurately an abundance vector for said current pixel; and (d-7) going back to step (d-5) and iterating steps (d-5) and (d-6) until pixel ending in said hyperspectral image cube.

16. A method for hyperspectral imagery exploitation and pixel spectral unmixing, as recited in claim 15, wherein, in step (d-3), said parameter estimator for calculation of said abundance estimation for said first pixel is a Least Square (LS) estimator.

17. A method for hyperspectral imagery exploitation and pixel spectral unmixing, as recited in claim 15, wherein, in step (d-3), said parameter estimator for calculation of said abundance estimation for said first pixel is a Maximum Likelihood (ML) estimator.

18. A method for hyperspectral imagery exploitation and pixel spectral unmixing, as recited in claim 15, wherein, in step (d-3), said parameter estimator for calculation of said abundance estimation for said first pixel is an evolutionary algorithm.

19. A method for hyperspectral imagery exploitation and pixel spectral unmixing, as recited in claim 15, said Kalman filter is a universal robust Kalman filter.

20. A method for hyperspectral imagery exploitation and pixel spectral unmixing, as recited in claim 19, wherein said universal robust Kalman filter processes the steps of:

(f.1) receiving said measurement data for said pixel from said atmospheric compensation module;

(f.2) validating said measurement data using a fuzzy logic inference process in a fuzzy logic module, wherein said fuzzy logic inference process is used to decide selectively to reject said measurement data, to correct said measurement data according to a plenty of fuzzy logic rules, and to approve said measurement data;

(f.3) outputting said corrected measurement data or a bad measurement flag to a preprocessing module, wherein said preprocessing module performs the calculation of a state transit matrix and a measurement matrix;

(f.4) sending said state transit matrix from said preprocessing module to a state vector prediction module, sending a previous state vector from an updating state vector module to said state vector prediction module, wherein said state vector prediction module performs state vector prediction, that is said abundance estimation for said next pixel;

(f.5) sending said state transit matrix from said preprocessing module to a covariance propagation module, wherein said covariance propagation module computes a current covariance of an estimation error;

(f.6) sending said measurement matrix and a current measurement vector from said preprocessing module to a computing measurement residue module, wherein said computing measurement residue module receives said predicted state vector from said state vector prediction module and performs computation of a measurement residue by subtracting the multiplication of said measurement matrix and said predicted current state from said current measurement vector;

(f.7) sending said current covariance of said estimation error from said covariance propagation module to a computing optimal gain module, wherein said computing optimal gain module performs the computation of an optimal gain;

(f.8) sending said optimal gain from said computing optimal gain module to a covariance updating module, wherein said covariance updating module updates said covariance of said estimation error;

(f.9) sending said updated covariance of said estimation error from said covariance updating module to said covariance propagation module; and (f.10) sending said optimal gain from said computing optimal gain module to said updating state vector module, wherein said updating state vector module receives said measurement residue from said computing measurement residue module and performs the state vector updating, that is said abundance estimation for said next pixel.

21. A method for hyperspectral imagery exploitation and pixel spectral unmixing, as recited in claim 20, wherein the step (f.2) comprises the steps of:

(f.2-1) sending said measurement data to a fuzzifier module, wherein said fuzzifier performs a scale mapping that transfers the range of said measurement data into a corresponding universe of discourse, and performs the fuzzification that converts said measurement data into suitable linguistic values which are labeled as fuzzy sets; and interprets a crisp measurement data as a fuzzy set with a membership function belonging to [0, 1] for obtaining fuzzy input;

(f.2-2) sending s aid fuzzy input from said fuzzifier module to a fuzzy interface engine, wherein said fuzzy interface engine basically simulates human decision making procedures and infers fuzzy outputs employing fuzzy implication and the fuzzy logic inference rules, wherein said fuzzy logic inference rules from a fuzzy rule base characterizes the goals and policy of the domain of experts by means of a set of linguistic rules, wherein said fuzzy rule base comprises the knowledge of the application domain and the attendant goals; and (f.2-3) sending said fuzzy outputs from said fuzzy interface engine to a defuzzifier module, wherein said defuzzifier module generates a crisp validated measurement data that best represents the possibility distribution of inferred fuzzy outputs.

22. A method for hyperspectral imagery exploitation and pixel spectral unmixing, as recited in claim 15, wherein said genetic algorithm unimixng processes the steps of:

generating randomly a population of binary strings by a coding module which represent said abundance estimation related to said pixel of said hyperspectral image cube; wherein a genetic algorithm works with said binary strings and said binary strings are sent to a decoding module;

decoding said binary strings by said decoding module, wherein an output of said decoding module is a population of said abundance estimation related to said pixel of said hyperspectral image cube which is sent to a fitness value computation module, wherein said abundance estimation gives the percentage of each material of interest involved in said pixel;

computing fitness value on each said abundance estimation by a fitness value computation module; wherein in said fitness value computation module, a cost function takes said binary string called chromosome and returns a value, wherein said value of said cost function is then mapped into a fitness value so as to fit into said genetic algorithm; wherein said fitness value is a reward based on the performance of the possible solution represented by said binary string; wherein the better said abundance estimation encoded by said binary string, the higher said fitness; wherein said fitness values are sent to a reproduction module;

performing a discrimination to determine whether to stop evolution or not, wherein a discrimination criteria is defined as a number of total evolution generations: when said genetic algorithm iterates to said number of total evolution generations, one of said binary strings with highest fitness is selected as solution and said genetic algorithm quit evolution, wherein a corresponding abundance estimation vector thereof is said abundance estimate of said pixel;

performing reproduction in said reproduction module based on said fitness values output from said fitness value computation module; wherein said reproduction is based on the principle of survival of the better fitness: said strings with large fitness would have a large number of copies in the new generation; wherein once said binary strings are reproduced for possible use in the next generation, said binary strings are reproduced in a mating pool where said binary strings await the action of the other two operators, crossover and mutation;

generating a population of offspring by exchanging tails and heads of said binary strings in a crossover module; wherein crossover provides a mechanism for said binary strings to mix and match their desirable qualities through a random process, in which, first, two newly said reproduced strings are selected from said mating pool produced by said reproduction module, second, a position along the two strings is selected uniformly at random, third, all characters following the crossing sit are exchanged;

alternating occasionally a value at a particular string position in a mutation module, wherein said mutation is an insurance policy against the permanent loss of any simple bit, and it is applied with a low probability such that it is chosen so that on average one string in the population is mutated; and sending said new population of said binary strings to said decoding module, then do the steps (2), (3), (4), (5), (6), (7), and (8).

23. A method for hyperspectral imagery exploitation and pixel spectral unmixing, comprising the steps of:

(a) receiving a hyperspectral image cube from a hyperspectral imaging sensor, wherein said hyperspectral image cube represents a scene in terms of wavelength and spatial position;

(b) performing an image registration from band to band in an image registration module, wherein said image registration is a process of making one band image transforming to another band image without involving a map coordinate system transformation, so as to assure a physical position corresponding to one pixel in one band image coinciding with that in another band image;

(c) sending said hyperspectral image cube registered in said image registration module to an atmospheric compensation module for compensating atmosphere effects in said atmospheric compensation module; and (d) unmixing hyperpsectral imagery data using genetic algorithm and robust Kalman filtering techniques, in a pixel by pixel fashion, until said hyperspectral image cube is completed, wherein the step (d) comprises the steps of:

(d-1) receiving spectral signatures of material of interest from a spectral library, and preprocessing said spectral signatures in a signature preprocessing module, wherein said spectral signatures from said spectral library are orthonormalized in said signature preprocessing module, so as to produce a decomposition of feature space into a collection of orthonormal signatures;

(d-2) receiving said orthogonal signatures from said signature preprocessing module and a set of measurement data for a first pixel from said atmospheric compensation module by a first pixel abundance estimation module, and calculating a abundance estimation for the first pixel using a parameter estimator, wherein for pixel except from said first pixel, said first pixel abundance estimation module just bypasses said measurement data from said atmospheric compensation module;

(d-3) receiving said orthogonal signatures from said signature preprocessing module and said measurement data for a current pixel from said atmospheric compensation module, and said abundance estimate for said first pixel from said first pixel abundance estimation module by a Kalman filter, and performing spectral unmixing for said current pixel using Kalman filtering technique, wherein said abundance estimation for said first pixel is used as an initial value for said Kalman filter, wherein said Kalman filter outputs an abundance estimation for said current pixel to a genetic algorithm unmixing module;

(d-4) evaluating an estimation error for said abundance estimation of said current pixel, wherein when said estimation error is larger than a preset threshold, go to the step (d-5), wherein said estimation error is given by a covariance matrix of the Kalman filter; otherwise, go to the step (d-6), wherein said genetic algorithm unmixing module just bypasses said abundance estimation derived by said Kalman filter;

(d-5) receiving said orthogonal signatures from said signature preprocessing module and said measurement data for said current pixel from said atmospheric compensation module, and said abundance estimate for said current pixel from said Kalman filter by said genetic algorithm unmixing module, and performing accurate spectral unmixing for said current pixel using said genetic algorithm to derive accurate abundance estimation, wherein said accurate abundance estimation is a system output, wherein an accurate abundance estimation for said current pixel is fed back to said Kalman filter to be used as a new initial value for abundance estimation for a next pixel in said Kalman filter, wherein an output of said Kalman filter is used as a starting point for said genetic algorithm unmixing module to accelerate the evolution of the genetic algorithm;

(d-6) going to said next pixel, and receiving said orthogonal signatures from said signature preprocessing module and said measurement data for said current pixel from said atmospheric compensation module, and said accurate abundance estimate for the previous pixel from said genetic algorithm unmixing module by said Kalman filter, and performing spectral unmixing for said current pixel using Kalman filtering technique, wherein said accurate abundance estimation from said genetic algorithm unmixing module is used as an abundance estimation for the previous pixel in said Kalman filter to estimate accurately the abundance vector for said current pixel; and (d-7) going back to the step (d-4) and iterating the steps (d-4), (d-5), and (d-6) until pixel ending in said hyperspectral image cube.

24. A method for hyperspectral imagery exploitation and pixel spectral unmixing, as recited in claim 23, wherein, in the step (d-2), said parameter estimator for calculation of said abundance estimation for said first pixel is a Least Square (LS) estimator.

25. A method for hyperspectral imagery exploitation and pixel spectral unmixing, as recited in claim 23, wherein, in the step (d-2), said parameter estimator for calculation of said abundance estimation for said first pixel is a Maximum Likelihood (ML) estimator.

26. A method for hyperspectral imagery exploitation and pixel spectral unmixing, as recited in claim 23, wherein, in the step (d-2), said parameter estimator for calculation of said abundance estimation for said first pixel is an evolutionary algorithm.

27. A method for hyperspectral imagery exploitation and pixel spectral unmixing, as recited in claim 23, said Kalman filter is a universal robust Kalman filter.

28. A method for hyperspectral imagery exploitation and pixel spectral unmixing, as recited in claim 27, wherein said universal robust Kalman filter processes the steps of:

(f.1) receiving said measurement data for said pixel from said atmospheric compensation module;

(f.2) validating said measurement data using a fuzzy logic inference process in a fuzzy logic module, wherein said fuzzy logic inference process is used to decide selectively to reject said measurement data, to correct said measurement data according to a plenty of fuzzy logic rules, and to approve said measurement data;

(f.3) outputting said corrected measurement data or a bad measurement flag to a preprocessing module, wherein said preprocessing module performs the calculation of a state transit matrix and a measurement matrix;

(f.4) sending said state transit matrix from said preprocessing module to a state vector prediction module, sending a previous state vector from an updating state vector module to said state vector prediction module, wherein said state vector prediction module performs state vector prediction, that is said abundance estimation for said next pixel;

(f.5) sending said state transit matrix from said preprocessing module to a covariance propagation module, wherein said covariance propagation module computes a current covariance of an estimation error;

(f.6) sending said measurement matrix and a current measurement vector from said preprocessing module to a computing measurement residue module, wherein said computing measurement residue module receives said predicted state vector from said state vector prediction module and performs computation of a measurement residue by subtracting the multiplication of said measurement matrix and said predicted current state from said current measurement vector;

(f.7) sending said current covariance of said estimation error from said covariance propagation module to a computing optimal gain module, wherein said computing optimal gain module performs the computation of an optimal gain;

(f.8) sending said optimal gain from said computing optimal gain module to a covariance updating module, wherein said covariance updating module updates said covariance of said estimation error;

(f.9) sending said updated covariance of said estimation error from said covariance updating module to said covariance propagation module; and (f.10) sending said optimal gain from said computing optimal gain module to said updating state vector module, wherein said updating state vector module receives said measurement residue from said computing measurement residue module and performs the state vector updating, that is said abundance estimation for said next pixel.

29. A method for hyperspectral imagery exploitation and pixel spectral unmixing, as recited in claim 28, wherein the step (f.2) comprises the steps of:

(f.2-1) sending said measurement data to a fuzzifier module, wherein said fuzzifier performs a scale mapping that transfers the range of said measurement data into a corresponding universe of discourse, and performs the fuzzification that converts said measurement data into suitable linguistic values which are labeled as fuzzy sets; and interprets a crisp measurement data as a fuzzy set with a membership function belonging to [0, 1] for obtaining fuzzy input;

(f.2-2) sending said fuzzy input from said fuzzifier module to a fuzzy interface engine, wherein said fuzzy interface engine basically simulates human decision making procedures and infers fuzzy outputs employing fuzzy implication and the fuzzy logic inference rules, wherein said fuzzy logic inference rules from a fuzzy rule base characterizes the goals and policy of the domain of experts by means of a set of linguistic rules, wherein said fuzzy rule base comprises the knowledge of the application domain and the attendant goals; and (f.2-3) sending said fuzzy outputs from said fuzzy interface engine to a defuzzifier module, wherein said defuzzifier module generates a crisp validated measurement data that best represents the possibility distribution of inferred fuzzy outputs.

30. A method for hyperspectral imagery exploitation and pixel spectral unmixing, as recited in claim 23, wherein said genetic algorithm unimixng processes the steps of:

generating randomly a population of binary strings by a coding module which represent said abundance estimation related to said pixel of said hyperspectral image cube; wherein a genetic algorithm works with said binary strings and said binary strings are sent to a decoding module;

decoding said binary strings by said decoding module, wherein an output of said decoding module is a population of said abundance estimation related to said pixel of said hyperspectral image cube which is sent to a fitness value computation module, wherein said abundance estimation gives the percentage of each material of interest involved in said pixel;

computing fitness value on each said abundance estimation by a fitness value computation module; wherein in said fitness value computation module, a cost function takes said binary string called chromosome and returns a value, wherein said value of said cost function is then mapped into a fitness value so as to fit into said genetic algorithm; wherein said fitness value is a reward based on the performance of the possible solution represented by said binary string; wherein the better said abundance estimation encoded by said binary string, the higher said fitness; wherein said fitness values are sent to a reproduction module;

performing a discrimination to determine whether to stop evolution or not, wherein a discrimination criteria is defined as a number of total evolution generations: when said genetic algorithm iterates to said number of total evolution generations, one of said binary strings with highest fitness is selected as solution and said genetic algorithm quit evolution, wherein a corresponding abundance estimation vector thereof is said abundance estimate of said pixel;

performing reproduction in said reproduction module based on said fitness values output from said fitness value computation module; wherein said reproduction is based on the principle of survival of the better fitness: said strings with large fitness would have a large number of copies in the new generation; wherein once said binary strings are reproduced for possible use in the next generation, said binary strings are reproduced in a mating pool where said binary strings await the action of the other two operators, crossover and mutation;

generating a population of offspring by exchanging tails and heads of said binary strings in a crossover module; wherein crossover provides a mechanism for said binary strings to mix and match their desirable qualities through a random process, in which, first, two newly said reproduced strings are selected from said mating pool produced by said reproduction module, second, a position along the two strings is selected uniformly at random, third, all characters following the crossing sit are exchanged;

alternating occasionally a value at a particular string position in a mutation module, wherein said mutation is an insurance policy against the permanent loss of any simple bit, and it is applied with a low probability such that it is chosen so that on average one string in the population is mutated; and sending said new population of said binary strings to said decoding module, then do the steps (2), (3), (4), (5), (6), (7), and (8).

31. A method for hyperspectral imagery exploitation and pixel spectral unmixing, comprising the steps of:

(a) receiving a hyperspectral image cube from a hyperspectral imaging sensor, wherein said hyperspectral image cube represents a scene in terms of wavelength and spatial position;

(b) performing an image registration from band to band in an image registration module, wherein said image registration is a process of making one band image transforming to another band image without involving a map coordinate system transformation, so as to assure a physical position corresponding to one pixel in one band image coinciding with that in another band image;

(c) sending said hyperspectral image cube registered in said image registration module to an atmospheric compensation module for compensating atmosphere effects in said atmospheric compensation module; and (d) unmixing hyperpsectral imagery data using genetic algorithm and robust Kalman filtering techniques, in a pixel by pixel fashion, until said hyperspectral image cube is completed, wherein the step (d) comprises the steps of:

(d-1) receiving spectral signatures of material of interest from a spectral library, and preprocessing said spectral signatures in a signature preprocessing module, wherein said spectral signatures from said spectral library are orthonormalized in said signature preprocessing module, so as to produce a decomposition of feature space into a collection of orthonormal signatures;

(d-2) receiving said orthogonal signatures from said signature preprocessing module and said measurement data from said atmospheric compensation module by an artificial neural network and performing material category selection, wherein said artificial neural network bypasses said measurement data from said atmospheric compensation module to following modules;

(d-3) receiving said orthogonal signatures from said signature preprocessing module, said measurement data for a first pixel from said atmospheric compensation module, and said categories for said first pixel from said artificial neural network by a first pixel abundance estimation module, and calculating an abundance estimation for said first pixel using a parameter estimator, wherein said abundance estimation for said first pixel is used as an initial value for a Kalman filter, wherein for pixel except from said first pixel, said first pixel abundance estimation module just bypasses said measurement data from said artificial neural network;

(d-4) receiving said orthogonal signatures from said signature preprocessing module and said measurement data for a current pixel from said atmospheric compensation module, said categories from said artificial neural network, and said abundance estimate for said first pixel from said first pixel abundance estimation module by said Kalman filter, and performing spectral unmixing for said current pixel using Kalman filtering technique, wherein said Kalman filter outputs said abundance estimation for said current pixel to a genetic algorithm unmixing module;

(d-5) evaluating an estimation error for said abundance estimation of said current pixel, wherein when said estimation error is larger than a preset threshold, go to the step (d-6), wherein said estimation error is given by a covariance matrix of said Kalman filter; otherwise, go to the step (d-7), wherein said genetic algorithm unmixing module just bypasses said abundance estimation derived by said Kalman filter;

(d-6) receiving said orthogonal signatures from said signature preprocessing module and said measurement data for said current pixel from said atmospheric compensation module, said categories from said artificial neural network, and said abundance estimate for said current pixel from said Kalman filter by a genetic algorithm unmixing module, and performing accurate spectral unmixing for said current pixel using genetic algorithm to derive an accurate abundance estimation, wherein said accurate abundance estimation is a system output, wherein an output of said Kalman filter is used as a starting point for said genetic algorithm unmixing module to accelerate the evolution of the genetic algorithm, wherein said accurate abundance estimation is fed back to said Kalman filter to be used as a new initial value for an abundance estimation for a next pixel in said Kalman filter;

(d-7) going to said next pixel, and receiving said orthogonal signatures from said signature preprocessing module and said measurement data for said current pixel from said atmospheric compensation module, said categories from said artificial neural network, and said abundance estimate for the previous pixel from said genetic algorithm unmixing module by said Kalman filter, and performing spectral unmixing for said current pixel using Kalman filtering technique, wherein said accurate abundance estimation from said genetic algorithm unmixing module is used as said abundance estimation for the previous pixel in said Kalman filter to estimate accurately the abundance vector for said current pixel; and (d-8) going -back to the step (d-5) and iterating the steps (d-5), (d-6), and (d-7) until pixel ending in said hyperspectral image cube.

32. A method for hyperspectral imagery exploitation and pixel spectral unmixing, as recited in claim 31, wherein, in the step (d-3), said parameter estimator for calculation of said abundance estimation for said first pixel is a Least Square (LS) estimator.

33. A method for hyperspectral imagery exploitation and pixel spectral unmixing, as recited in claim 31, wherein, in the step (d-3), said parameter estimator for calculation of said abundance estimation for said first pixel is a Maximum Likelihood (ML) estimator.

34. A method for hyperspectral imagery exploitation and pixel spectral unmixing, as recited in claim 31, wherein, in the step (d-3), said parameter estimator for calculation of said abundance estimation for said first pixel is an evolutionary algorithm.

35. A method for hyperspectral imagery exploitation and pixel spectral unmixing, as recited in claim 31, said Kalman filter is a universal robust Kalman filter.

36. A method for hyperspectral imagery exploitation and pixel spectral unmixing, as recited in claim 35, wherein said universal robust Kalman filter processes the steps of:

(f.1) receiving said measurement data for said pixel from said atmospheric compensation module;

(f.2) validating said measurement data using a fuzzy logic inference process in a fuzzy logic module, wherein said fuzzy logic inference process is used to decide selectively to reject said measurement data, to correct said measurement data according to a plenty of fuzzy logic rules, and to approve said measurement data;

(f.3) outputting said corrected measurement data or a bad measurement flag to a preprocessing module, wherein said preprocessing module performs the calculation of a state transit matrix and a measurement matrix;

(f.4) sending said state transit matrix from said preprocessing module to a state vector prediction module, sending a previous state vector from an updating state vector module to said state vector prediction module, wherein said state vector prediction module performs state vector prediction, that is said abundance estimation for said next pixel;

(f.5) sending said state transit matrix from said preprocessing module to a covariance propagation module, wherein said covariance propagation module computes a current covariance of an estimation error;

(f.6) sending said measurement matrix and a current measurement vector from said preprocessing module to a computing measurement residue module, wherein said computing measurement residue module receives said predicted state vector from said state vector prediction module and performs computation of a measurement residue by subtracting the multiplication of said measurement matrix and said predicted current state from said current measurement vector;

(f.7) sending said current covariance of said estimation error from said covariance propagation module to a computing optimal gain module, wherein said computing optimal gain module performs the computation of an optimal gain;

(f.8) sending said optimal gain from said computing optimal gain module to a covariance updating module, wherein said covariance updating module updates said covariance of said estimation error;

(f.9) sending said updated covariance of said estimation error from said covariance updating module to said covariance propagation module; and (f.10) sending said optimal gain from said computing optimal gain module to said updating state vector module, wherein said updating state vector module receives said measurement residue from said computing measurement residue module and performs the state vector updating, that is said abundance estimation for said next pixel.

37. A method for hyperspectral imagery exploitation and pixel spectral unmixing, as recited in claim 36, wherein the step (f.2) comprises the steps of:

(f.2-1) sending said measurement data to a fuzzifier module, wherein said fuzzifier performs a scale mapping that transfers the range of said measurement data into a corresponding universe of discourse, and performs the fuzzification that converts said measurement data into suitable linguistic values which are labeled as fuzzy sets; and interprets a crisp measurement data as a fuzzy set with a membership function belonging to [0, 1] for obtaining fuzzy input;

(f.2-2) sending said fuzzy input from said fuzzifier module to a fuzzy interface engine, wherein said fuzzy interface engine basically simulates human decision making procedures and infers fuzzy outputs employing fuzzy implication and the fuzzy logic inference rules, wherein said fuzzy logic inference rules from a fuzzy rule base characterizes the goals and policy of the domain of experts by means of a set of linguistic rules, wherein said fuzzy rule base comprises the knowledge of the application domain and the attendant goals; and (f.2-3) sending said fuzzy outputs from said fuzzy interface engine to a defuzzifier module, wherein said defuzzifier module generates a crisp validated measurement data that best represents the possibility distribution of inferred fuzzy outputs.

38. method for hyperspectral imagery exploitation and pixel spectral unmixing, as recited in claim 31, wherein said genetic algorithm unimixng processes the steps of:

generating randomly a population of binary strings by a coding module which represent said abundance estimation related to said pixel of said hyperspectral image cube; wherein a genetic algorithm works with said binary strings and said binary strings are sent to a decoding module;

decoding said binary strings by said decoding module, wherein an output of said decoding module is a population of said abundance estimation related to said pixel of said hyperspectral image cube which is sent to a fitness value computation module, wherein said abundance estimation gives the percentage of each material of interest involved in said pixel;

computing fitness value on each said abundance estimation by a fitness value computation module; wherein in said fitness value computation module, a cost function takes said binary string called chromosome and returns a value, wherein said value of said cost function is then mapped into a fitness value so as to fit into said genetic algorithm; wherein said fitness value is a reward based on the performance of the possible solution represented by said binary string; wherein the better said abundance estimation encoded by said binary string, the higher said fitness; wherein said fitness values are sent to a reproduction module;

performing a discrimination to determine whether to stop evolution or not, wherein a discrimination criteria is defined as a number of total evolution generations: when said genetic algorithm iterates to said number of total evolution generations, one of said binary strings with highest fitness is selected as solution and said genetic algorithm quit evolution, wherein a corresponding abundance estimation vector thereof is said abundance estimate of said pixel;

performing reproduction in said reproduction module based on said fitness values output from said fitness value computation module; wherein said reproduction is based on the principle of survival of the better fitness: said strings with large fitness would have a large number of copies in the new generation; wherein once said binary strings are reproduced for possible use in the next generation, said binary strings are reproduced in a mating pool where said binary strings await the action of the other two operators, crossover and mutation;

generating a population of offspring by exchanging tails and heads of said binary strings in a crossover module; wherein crossover provides a mechanism for said binary strings to mix and match their desirable qualities through a random process, in which, first, two newly said reproduced strings are selected from said mating pool produced by said reproduction module, second, a position along the two strings is selected uniformly at random, third, all characters following the crossing sit are exchanged;

alternating occasionally a value at a particular string position in a mutation module, wherein said mutation is an insurance policy against the permanent loss of any simple bit, and it is applied with a low probability such that it is chosen so that on average one string in the population is mutated; and sending said new population of said binary strings to said decoding module, then do the steps (2), (3), (4), (5), (6), (7), and (8).

* * * * *